United States Patent
Steiner et al.

(10) Patent No.: US 12,179,559 B2
(45) Date of Patent: Dec. 31, 2024

(54) COVER FOR A PRESSURE RELIEF VALVE ASSEMBLY OF A VEHICLE, A PRESSURE RELIEF VALVE ASSEMBLY HAVING SUCH A COVER, AND A METHOD FOR PRODUCING A CORRESPONDING COVER

(71) Applicant: ILLINOIS TOOL WORKS INC., Glenview, IL (US)

(72) Inventors: Norbert Steiner, Hof (DE); Matthias Frisch, Hof (DE); Stefan Jatzke, Eberstsheim (DE)

(73) Assignee: ILLINOIS TOOL WORKS INC., Glenview, IL (US)

( * ) Notice: Subject to any disclaimer, the term of this patent is extended or adjusted under 35 U.S.C. 154(b) by 229 days.

(21) Appl. No.: 17/551,646

(22) Filed: Dec. 15, 2021

(65) Prior Publication Data
US 2022/0185070 A1    Jun. 16, 2022

(30) Foreign Application Priority Data

Dec. 16, 2020   (DE) ...................... 10 2020 133 700.0
Jul. 14, 2021   (DE) ...................... 10 2021 118 189.5

(51) Int. Cl.
  *B60H 1/24*   (2006.01)
  *B60H 1/00*   (2006.01)
  *F16K 17/02*  (2006.01)

(52) U.S. Cl.
  CPC ............ *B60H 1/249* (2013.01); *F16K 17/02* (2013.01); *B60H 2001/006* (2013.01)

(58) Field of Classification Search
  CPC .......................... B60H 1/249; B60H 2001/006
  USPC ......................................................... 454/162
  See application file for complete search history.

(56) References Cited

U.S. PATENT DOCUMENTS

| | | | |
|---|---|---|---|
| 6,210,266 B1* | 4/2001 | Barton .................. | B60H 1/249 454/162 |
| 7,137,880 B2* | 11/2006 | Omiya .................. | B60H 1/249 454/162 |
| 2016/0152114 A1* | 6/2016 | Yamamoto ............ | F16K 15/031 454/162 |
| 2019/0275863 A1* | 9/2019 | Barnes .................. | B60H 1/249 |

FOREIGN PATENT DOCUMENTS

| DE | 3503600 A1 | 8/1986 |
|---|---|---|
| DE | 2016011869 A1 | 5/2018 |

* cited by examiner

*Primary Examiner* — Allen R. B. Schult
(74) *Attorney, Agent, or Firm* — THOMPSON HINE LLP (57) ABSTRACT

A cover (1) for a pressure relief valve assembly (2) of a vehicle, wherein the cover (1) comprises a base body (19) made of a sound-absorbing material which is uniform in terms of the material composition, wherein the base body as such is designed to be self-supporting and is in particular connectable to an edge region (4) of a pressure relief valve assembly (2).

10 Claims, 7 Drawing Sheets

FIG. 1

(Prior Art)

COVER FOR A PRESSURE RELIEF VALVE ASSEMBLY OF A VEHICLE, A PRESSURE RELIEF VALVE ASSEMBLY HAVING SUCH A COVER, AND A METHOD FOR PRODUCING A CORRESPONDING COVER

TECHNICAL FIELD

The present invention relates generally to air venting apparatuses for the interior of vehicles, wherein such air venting apparatuses are also referred to herein as "pressure relief valve assemblies." Air venting apparatuses or pressure relief valve assemblies for the interior of vehicles typically have a frame surrounding a vent opening on which at least one valve lies externally, said valve covering the vent opening and being pivotable away from it.

BACKGROUND

In particular, a pressure relief valve assembly of the type considered herein has at least one pressure relief valve and/or at least one valve flap, wherein the at least one pressure relief valve and/or at least one valve flap is preferably received in a frame.

Such air venting apparatuses and pressure relief valve assemblies are generally known in various embodiments.

In this context, for example, reference is made to the publication DE 35 03 600 A1. In the pressure relief valve assembly known from this prior art, an air flow from the interior of the vehicle can pass outwardly via the vent opening, namely in that this air flow lifts the at least one flap of the pressure relief valve assembly away from the frame due to the adjustment of pressure ratios. On the other hand, the ingress of ambient air into the interior of the vehicle through the flap, which is now resting on the frame, is successfully prevented.

Accordingly, pressure relief valve assemblies of the type considered herein serve to reduce the build-up of air pressure in the interior of the vehicle, for example when closing a tailgate of the vehicle. The pressure relief valve, typically configured as a flap, can open at an increased air pressure in the interior of the vehicle in order to allow air to escape within the interior, thereby reducing air pressure in the interior of the vehicle and reducing the effort needed in order to, for example, close the tailgate.

Moreover, a vehicle having a pressure relief valve assembly can influence airflow from the vehicle cabin in order to increase passenger comfort. Because a climate system draws ambient air from outside the vehicle and introduces air into the vehicle cabin, a venting through the pressure relief valve assembly is required in order to achieve proper circulation and reduce the pressure build-up.

Particularly when opening the pressure relief valve associated with the pressure relief valve assembly, however, noise from outside can permeate through the opening. In addition, even in the closed state of the pressure relief valve, outside noise can enter the vehicle cabin. Moreover, in certain driving situations, the closing noise of the pressure relief valve can be perceived as disruptive to the vehicle occupants.

In order to reduce the ingress of noise and exterior elements into the vehicle cabin, pressure relief valves can be designed to be as small as possible, however, this limits the rate at which pressure compensation can be achieved with the pressure relief valve assembly.

Alternatively, in the case of pressure compensation caused by means of the pressure relief valve assembly, it is conceivable to provide the pressure relief valve assembly with a type of "muffler" in order to reduce noise. For this purpose, it is known to place a cover on the pressure relief valve assembly in order to form a muffler space, wherein, when the pressure relief valve assembly is open, a flow-like path between the vehicle interior and the outer atmosphere passes through the muffler space at least regionally.

However, the production of covers serving as a muffler space for pressure relief valve assemblies is relatively complex, because the cover is a three-dimensional structure, which is typically embodied as an injection-molded component, wherein the inner walls of the three-dimensionally embodied cover must be provided with corresponding sound-absorbing materials in a separate working step. This working step is typically carried out at production stations that are different from the production stations in which the housing of the cover is produced and in particular injection-molded. As a result, for the production of the cover, there is an increase in the assembly effort and assembly costs, in particular, and thus the overall cost of production of the cover.

SUMMARY

Based on this situation, the underlying problem addressed by the present invention is to provide a cover for a pressure relief valve assembly of a vehicle, wherein the cover can be produced with little effort and, in particular, at an especially low cost.

Furthermore, a corresponding method for producing such a cover for a pressure relief valve assembly of a vehicle is to be provided.

Accordingly, the invention relates to a cover for a pressure relief valve assembly of a vehicle, wherein the cover comprises a base body made of a sound-absorbing material which is uniform in terms of the material composition, and wherein in particular the base body as such is designed to be statically self-supporting and is in particular connectable to an edge region of a pressure relief valve assembly.

The advantages achievable with the solution according to the invention are obvious: in particular according to the invention, it is conceivable that a cover for a pressure relief valve assembly can preferably be produced entirely in a single working step or at least in a single work station. In this way, the overall production process is simplified and various machining steps can be omitted at various stations. This leads to significantly reduced production costs and effort.

In this context, it is in particular possible for a preferably substantially flat sound-absorbing material, for example in the form of a sheet of non-woven material, to be initially provided for the production of the cover according to the invention. Subsequently, the provided sound-absorbing material is reshaped such that a base body is formed with side walls and a cover region, which together delimit a three-dimensional muffler space.

Preferably, during the reshaping step and/or before or in particular after the reshaping step, the sound-absorbing material is preferably regionally manipulated, in particular locally thermally treated and/or compressed or otherwise compacted, such that the base body has increased rigidity and/or strength at least in these regions, so that the base body as a whole is a self-supporting body, in particular a statically self-supporting body.

The term "self-supporting" or "statically self-supporting" as used herein generally refers to a construction of the base body in which the absorbent material forming the base body is consolidated into a unit in such a way that the base body as such assumes the supporting function of the cover. All regions of the base body act statically as shells as a whole and absorb the introduced forces as a whole.

The rigidity required for this purpose, which is ensured by the base body, is achieved by the incorporation of compact, preferably honeycomb-, rib-, or strut-shaped regions with the greatest possible resistance torque into the absorbent material.

The advantages of the self-supporting structure of the base body of the cover formed purely from the absorbent material are—in addition to the simplified production—in particular also a lower weight due to the elimination of a frame formed from, in particular, an injection-molded plastic.

Various techniques can be used for reshaping the sound-absorbing material. Preferably, the base body is formed according to a type of deep-drawing process and/or by pressing or compression molding, in particular by thermal or non-thermal pressing or compression molding.

For example, according to embodiments, it is provided that, for the reshaping of the sound-absorbing material provided, the sound-absorbing material is reshaped using a molding tool according to a pressing, compression molding, and/or deep-drawing process, wherein the molding tool comprises an embossing die and a die in the form of a negative mold.

In order to form, in particular, honeycomb-, rib-, or strut-shaped regions for increasing the rigidity and/or strength of the base body, the embossing die and/or the die can comprise projecting or groove-shaped or rib-shaped regions, such that the sound-absorbing material is compressed or compacted regionally more strongly or less strongly during the compression molding or deep-drawing process.

These projecting or groove-shaped regions of the embossing die and/or die can be locally thermally heated in order to form the in particular honeycomb-, rib-, or strut-shaped regions by thermoforming or by hot compression molding.

The advantage of the solution according to the invention is, in particular, that the cover can preferably be formed from a single material or composite of materials in a (single) working step. The base body configured as a molding body is not overmolded, because the base body as such is designed to be self-supporting as a whole. This not only simplifies the production effort and the overall production process, but plastic materials can also be spared.

The sound-absorbing material is, in particular, a sound-absorbing non-woven fabric, in particular made of mineral wool, synthetic fibers, and/or natural fibers. In general, the latter is thus preferably a sheet of fibers of a limited length, continuous fibers (filaments), or cut yarns of any kind and any origin that have been connected and joined together in some way in order to form a non-woven fabric, i.e., a fibrous layer or a fibrous web.

Such non-woven fabrics are largely flexible textile sheets, i.e., they are slightly pliable, and their main structural elements are textile fibers and have a comparatively low thickness compared to their length and width. The non-woven fabrics exhibit excellent sound absorption behavior. In other words, such non-woven fabrics are suitable for reducing sonic energy, particularly by conversion into heat. In this case, the term "sound-absorbing" means the "swallowing" of sound.

The present invention is based in particular on the finding that the three-dimensionally designed base body of the cover can, in particular, be formed by a reshaping process, even when the starting material, namely the preferably substantially flat sound-absorbing material in particular in the form of a sheet of a non-woven material, is not "plastically deformed" in the actual sense during the reshaping process, as is common for example during the tensile pressure reshaping of a sheet metal blank.

Rather, the sound-absorbing material does not exhibit a fully elastic (reversible) behavior during the reshaping process, such that, after the reshaping process by the sound-absorbing material, the three-dimensional shape predetermined in the course of the reshaping process is retained, wherein the sound-absorbing material still has a sufficient cavity portion after the reshaping, which is necessary for an optimal sound insulation.

Only in selected, in particular honeycomb-, rib-, or strut-shaped, regions is the sound-absorbing material more strongly compressed or compacted such that the sound absorption is reduced in these regions, but the strength and rigidity is significantly increased.

Thus, it is possible to form a three-dimensional base body of the cover preferably by means of a single reshaping process, in particular by means of a compression molding or deep-drawing process, which base body is self-supporting due to the honeycomb-, rib-, or strut-shaped regions and which nonetheless still comprises extensive regions in which the sound-absorbing material still has a sufficient sound absorbing capacity.

The base body of the cover is a one-piece, in particular monolithic base body and comprises side walls and a cover region, wherein the side walls and cover region together delimit a three-dimensional muffler space.

Preferably, during the production of the base body, the sound-absorbing material in an end region of the side walls opposite to the cover region is manipulated, in particular thermally treated and/or compressed or otherwise compacted, at least partly or regionally such that the base body has increased rigidity and/or strength in these regions. Thus, the base body of the cover can be easily connected to an edge region of a pressure relief valve assembly which is preferably configured as an air vent assembly.

According to embodiments, it is provided in this context that a rim or flange region is formed on the end region of the side walls opposite to the cover region, which projects radially outward at least regionally and via which the base body can be connected to a pressure relief valve assembly and in particular to an edge region of a pressure relief valve assembly which is preferably configured as an air vent assembly.

Various solutions are considered for connecting the cover to, in particular, an edge region of a pressure relief valve assembly, which is preferably configured as an air vent assembly.

For example, it is conceivable that the cover can be connected to the pressure relief valve assembly via an adhesive or welded bond between the end regions of the side walls opposite the cover region and the edge region of the pressure relief valve assembly.

Alternatively, however, it is also conceivable that latching connection elements, in particular latching projections, are configured in or on the end region of the side walls opposite to the cover region, via which the base body can be connected, preferably releasably, to a pressure relief valve assembly and in particular to an edge region of a pressure relief valve assembly, which is preferably configured as an air vent assembly.

Alternatively or in addition to the previously described embodiments of the cover according to the invention, it is provided according to a further aspect of the present invention that the cover comprises a base body made of a sound-absorbing material which is uniform in terms of the material composition, wherein the base body is in particular partially supplemented with a plastic to form a self-supporting composite component and is in particular connectable to an edge region of a pressure relief valve assembly.

In other words, according to this further aspect of the invention, the base body can be partially overmolded with a plastic. A self-supporting composite component is thereby formed.

Alternatively to a partial overmolding of the base body a plastic, however, it can also be provided that, in order to form the self-supporting composite component, the base body is connected to a plastic support structure, in particular in the form of a plastic frame, namely in particular with the aid of a form-fitting joining connection, preferably a clamping and/or a latching connection, or in particular with the aid of a material-locking joining connection, in particular welding or adhesive bonding.

According to advantageous implementations, it is provided that the plastic is preferably present exclusively and in particular partially on the outer wall regions of the cover. The outer wall regions, which can be partially provided with the plastic and/or which can be respectively overmolded with plastic, are the wall regions of the cover, which, when the cover is used as intended, face away from the pressure relief valve assembly.

According to preferred implementations, it can be provided in this context that the base body is formed by pressing, compression molding, and/or deep-drawing of a semi-finished product comprising a sound-absorbing material by means of a tool, wherein, in a further step, the base body is provided with the plastic by injection molding. In this context, it lends itself that, in the further step, the base body is preferably provided with the plastic by injection molding in the same tool.

Alternatively, however, it is also conceivable that the base body is formed by pressing, compression molding, and/or deep-drawing a semi-finished product comprising the sound-absorbing material by means of a tool, wherein, in a further step, the base body is fastened to or in a plastic support structure, in particular implemented as a plastic frame, in particular with the aid of a form-fitting joining connection, preferably a clamping and/or a latching connection, or in particular with the aid of a material-locking joining connection, in particular welding or adhesive bonding.

An injection molding device is preferably used in order to produce the base body partially overmolded with plastic. Here, the semi-finished product or the base body is inserted into an injection molding tool of the injection molding apparatus, wherein, in an edge region of the semi-finished product or base body, a sealing element surrounding the edge region is arranged. The inserted semi-finished product or the inserted base body is then overmolded with preferably a duroplastic or thermoplastic, wherein the sealing element seals the edge region against the injected duroplastic or thermoplastic.

An injection molding device is thus preferably used for partially overmolding a semi-finished product or the base body, wherein an injection molding tool of the injection molding device is configured such that a recess for receiving a first region of a sealing element for sealing an edge region of the semi-finished product or the base body during an overmolding of the semi-finished product or base body inserted into the injection molding tool is formed, and, in a nozzle-side mold plate of the injection molding tool, a recess for receiving a second region of the sealing element for sealing the edge region of the semi-finished product or base body during overmolding of the semi-finished product or base body is formed.

In this way, the self-supporting composite component is formed in a particularly efficient manner However, other embodiments are of course also possible in order to partially overmold the base body with plastic.

For example, it is conceivable that, in the production process, the base body is first placed in a cavity formed by two tool parts of a tool. In a further, in particular second step, the base body is preferably fixed in the cavity, in particular by moving the respective fixing elements of the tool towards each other and thereby at least partially moving them into the cavity, whereby the base body is fixed in the cavity by means of the fixing elements. In a further, for example third step of the method, an injection is carried out, whereby the plastic is injected at least at a sub-region of the base body fixed in the cavity. By injecting the plastic into the cavity, a free volume of the cavity is filled by the plastic, wherein the base body held in the cavity is then at least regionally surrounded by the plastic. In this case, there is direct contact between the base body and the plastic, and, in particular, the base body and the plastic can be connected to one another in a material-locking fashion.

According to a further production method of the composite component, it is provided that, in a first step, the base body is deep-drawn or compression-molded from the sound-absorbing material by means of a first tool and thus formed. In a further step, the base body is provided with the plastic by injection molding in the same tool. In other words, for at least regionally reshaping the semi-finished product, which is preferably flat and comprises the sound-absorbing material, and for providing it with the plastic, one and the same tool is used, which reduces the time and thus the cost of producing the cover embodied as a composite component. Further, the cover produced by this method has a particularly low weight as well as a particularly high rigidity. In addition, the cover produced with the method and configured as a composite component has advantageous mechanical properties, in particular as a result of a material-locking connection of the plastic to the sound-absorbing material of the semi-finished product.

High degrees of reshaping can also be realized with the aforementioned method, so that relatively complex geometries of the cover can also be realized by reshaping the base body or the semi-finished product comprising the sound-absorbing material. Because the sound-absorbing material of the semi-finished product is in particular a non-woven material, it is particularly advantageously deformable.

Due to the good geometrical designability of the semi-finished product comprising the sound-absorbing material as well as the material connection during injection molding, a functional integration of attachments can be implemented at a very low cost. In this context, rigidifying structures, in particular rigidifying rib structures, connection structures, and/or other functional structures, are formed by means of the plastic during injection molding and injected onto the deep-drawn or compression-molded semi-finished product, i.e., onto the base body.

Alternatively or additionally, it is possible to provide bushings and/or other inserts and to at least regionally receive them in the plastic, i.e., to overmold them with the plastic. The inserts can take over further functions, for example the connection of further attachments to the cover. This results in a further increase in the functional integration of the coverage. Further, it is possible to provide holes that act gently on the non-woven material in order to realize further functions.

In an alternative method for producing the cover according to the invention, it is provided that a preferably substantially flat sound-absorbing material is initially provided, in particular in the form of a sheet of a non-woven material, wherein the provided sound-absorbing material (12) is subsequently deformed in such a way that a base body is formed with side walls and a cover region, which together delimit a three-dimensional muffler space.

Preferably, during the reshaping step and/or in particular before or in particular after the reshaping step, the sound-absorbing material can be preferably regionally manipulated, in particular locally thermally treated and/or compressed or otherwise compacted, such that the base body has increased rigidity and/or strength at least in these regions, so that the base body as a whole is a self-supporting body.

Alternatively or in addition, after or during the reshaping step, the sound-absorbing material can be provided with a plastic, in particular partially on the outer side of the base body, by injection molding.

Further alternatively or in addition, after the reshaping step, the sound-absorbing material can be fastened to or in a plastic support structure, in particular implemented as a plastic frame, in particular with the aid of a form-fitting joining connection, preferably a clamping and/or a latching connection, or in particular with the aid of a material-locking joining connection, in particular welding or adhesive bonding.

The invention further relates to a pressure relief valve assembly for vehicles, wherein the pressure relief valve assembly comprises at least one air vent having at least one pressure relief valve received in a frame and/or having at least one valve flap received in a frame and a cover of the type according to the invention. The base body of the cover is preferably connected to the air vent and preferably to the frame of the air vent via at least one side wall of the base body, in particular via at least one snap-fitting and/or latching connection.

BRIEF DESCRIPTION OF THE DRAWINGS

Exemplary embodiments of the solution according to the invention are described in further detail below with reference to the accompanying drawings.

The following are shown.

DETAILED DESCRIPTION

In order to reduce the build-up of air pressure in the interior of a vehicle, for example when closing the tailgate, a vehicle can be provided with an opening and a pressure relief valve located in the opening. The pressure relief valve can open at an increased air pressure in the interior of the vehicle in order to allow air to escape within the interior, thereby reducing the air pressure in the interior of the vehicle and reducing the effort needed to close the tailgate.

Moreover, a vehicle having a pressure relief valve can influence airflow out of the vehicle cabin in order to increase passenger comfort. Because an air conditioning system draws ambient air from outside the vehicle and induces air into the vehicle cabin, a venting through the pressure relief valve is required in order to achieve proper circulation and to reduce pressurization in the cabin.

Because, for example, when a pressure relief valve is opened or even in the closed state of the pressure relief valve, noise can enter the interior of the vehicle from the outside, it is generally known from the prior art to assign to the pressure relief valve a cover serving as a sound-insulating space (muffler space). The cover serving as a sound-insulating space (muffler space) serves on the one hand for corresponding sound absorption and on the other hand also to dampen, in particular, closing noises of the pressure relief valve (flap closing noises).

Figure 1:
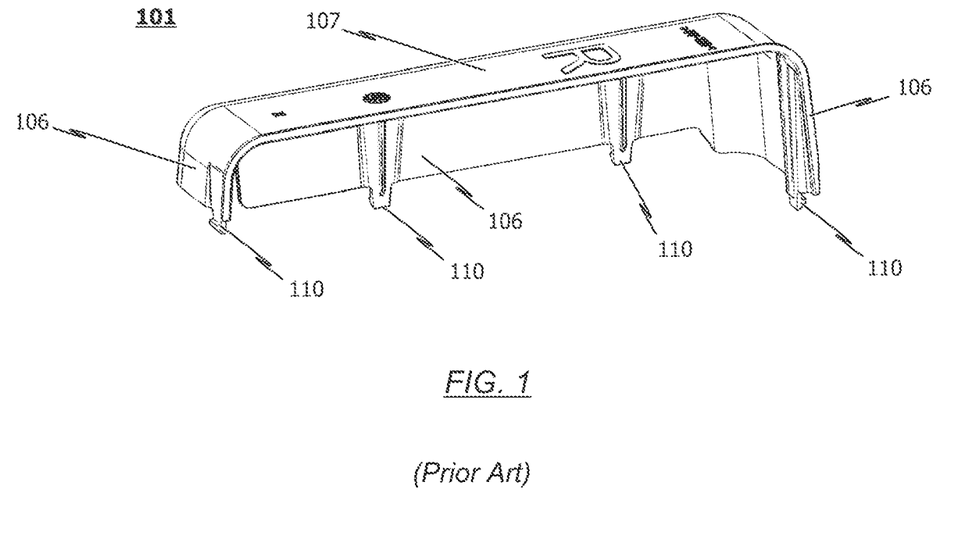
FIG. 1 shows schematically and in an isometric view, a cover known from the prior art for a pressure relief valve assembly of a vehicle.

One embodiment of a cover 101 for a pressure relief valve assembly 2 as known from the prior art is shown schematically and in an isometric view in FIG. 1.

The cover 101, which is generally known from this prior art, has, as a whole, a three-dimensional configuration that is formed by a plurality of side walls 106 and a wall region serving as a cover region 107. At corresponding edge regions of the side walls 106 facing away from the wall region serving as cover region 107, latching or snap-fitting connection elements 110 are provided, which allow the cover 101 to be connected to the frame or an edge region 4 of a pressure relief valve assembly 2 via a latching connection.

In order to achieve the most efficient sound reduction possible, a sound-absorbing material (not shown in FIG. 1) is typically arranged on the respective inner surfaces of the cover 101 in the form of at least one non-woven fabric mat or similar sound-insulating material.

However, the production of a conventional cover 101 known from the prior art, as shown in FIG. 1 for example, requires at least two automatable process steps that are separately performed and only with greater effort, if at all: in a first process step, the three-dimensional design of the cover 101 must be produced, which is usually carried out automatically as part of a plastic injection molding or plastic injection molding process. In a second process step, the three-dimensional design of the cover 101 must be provided with a sound-absorbing material.

However, the attachment of a sound-absorbing material to the inner surfaces of the cover 101 is relatively costly and usually takes place manually because, due to the three-dimensional design of the cover 101, commonly applicable automation techniques cannot be employed or only with relatively great effort.

In order to solve this situation, a cover 1 is proposed according to the invention, which cover no longer comprises an injection-molded component with additional sound-absorbing material, but rather comprises a base body made of a sound-absorbing material, which is uniform in terms of the material composition, wherein the base body is designed to be self-supporting as such and can be connected, in particular, to an edge region 4 of a pressure relief valve assembly 2.

In this way, it is possible that the cover 1 can be produced, in particular, in one and the same system to the extent that all of the features necessary for the operation of the cover 1 when used as intended are already configured in the same system.

Figure 2:
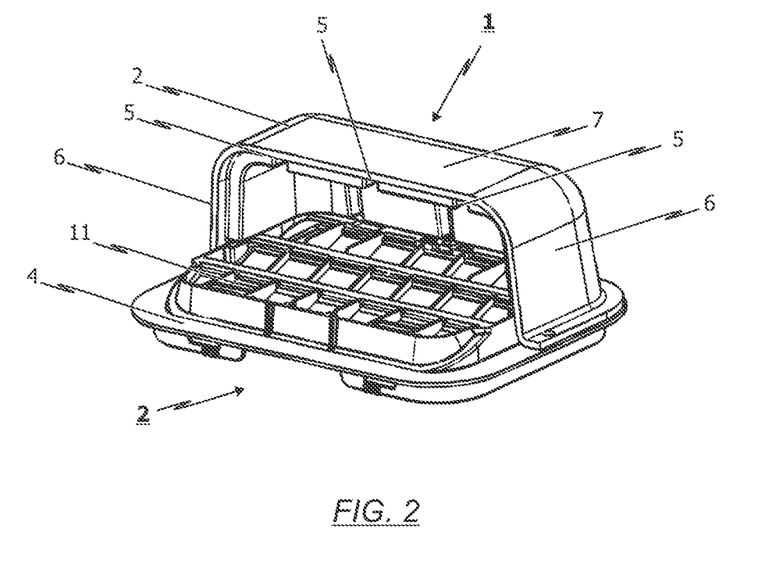
FIG. 2 shows schematically and in an isometric view, an exemplary embodiment of the pressure relief valve assembly according to the present invention with a first embodiment of a cover.

An exemplary embodiment of such a cover 1 connected to a pressure relief valve assembly 2 according to the invention is shown schematically and in an isometric view in FIG. 2.

It must be emphasized here that the base body of the cover 1 is, as a whole, uniformly formed from a sound-absorbing material and as such is self-supporting, so that it can be connected to, in particular, an edge region 4 of a pressure relief valve assembly 2 without additional injection-molded parts, etc.

Figure 3:
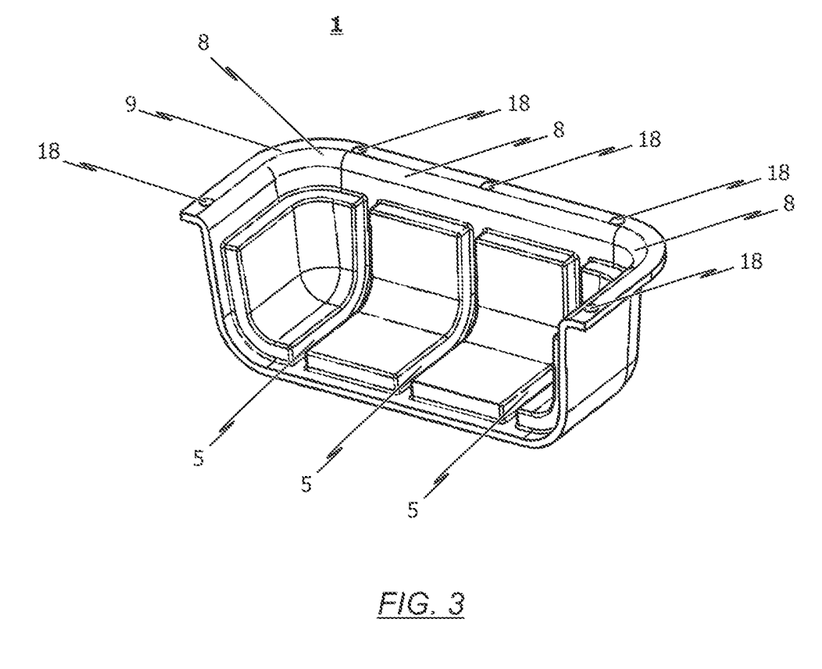
FIG. 3 shows schematically and in an isometric view, the cover of the exemplary pressure relief valve assembly according to FIG. 2.

As can be seen, for example, in FIG. 2 or in FIG. 3, the base body of the cover 1 comprises in particular honeycomb-, rib-, or strut-shaped regions 5, in which the sound-absorbing material has been manipulated during production of the base body, in particular thermally treated and/or compressed or otherwise compacted, such that the base body has increased rigidity and/or strength at least in these regions 5. The honeycomb-, rib-, or strut-shaped regions 5 help to ensure that the base body is designed to be self-supporting as a whole.

As can furthermore be seen from the illustrations in FIG. 2 and FIG. 3, the base body is a one-piece, in particular monolithic base body and comprises side walls 6 and a cover region 7, wherein the side walls 6 and the cover region 7 ultimately delimit the three-dimensional muffler space of the cover 1.

During the production of the base body, the sound-absorbing material in an end region 8 of the side walls 6 opposite to the cover region 7 has been manipulated, in particular thermally treated and/or compressed or otherwise compacted, at least partly or regionally such that the base body has increased rigidity and/or strength in this region 8. In this way, the base body in the cover 1 can be connected to the edge region 4 of the pressure relief valve assembly 2 in a defined manner.

Figure 4A:
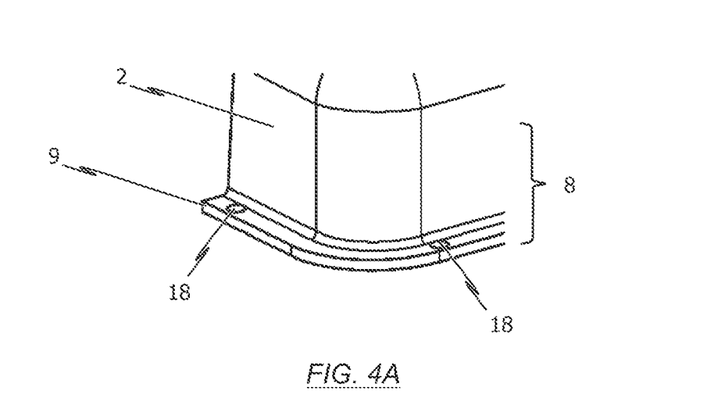
FIG. 4A shows schematically, and in an isometric view, a detail of the cover according to FIG. 3.

As indicated, for example, in FIG. 3 or FIG. 4, a rim or flange region 9 is formed on the end region 8 of the side walls 6 opposite to the cover region 7, which projects radially outward at least regionally and via which the base body can be connected to a pressure relief valve assembly 2 and in particular to an edge region 4 of a pressure relief valve assembly 2 which is preferably configured as an air vent assembly.

In this context, for example, reference is made to the illustration in FIG. 2.

Figure 4B:
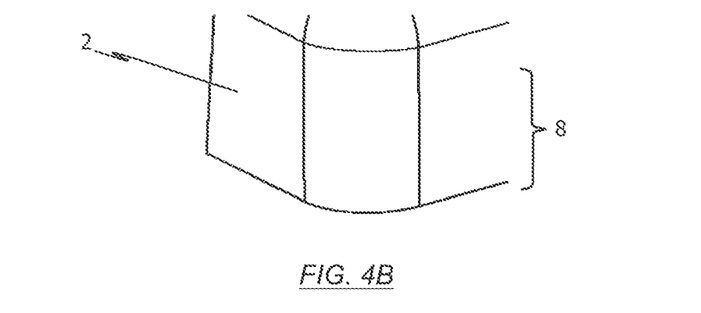
FIG. 4B shows schematically and in an isometric view, a second exemplary embodiment of the cover according to the invention.
Figure 4C:
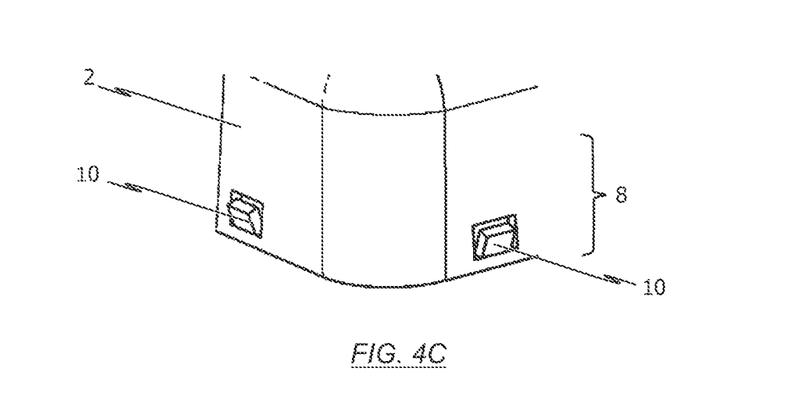
FIG. 4C shows schematically and in an isometric view, a detail of a third exemplary embodiment of the cover according to the invention.

However, as shown in FIG. 4B and FIG. 4C, other embodiments are also conceivable.

For example, FIG. 4B shows in sections that the base body of the cover 1 can also be configured without a rim or flange region 9, wherein the cover 1 or the base body of the cover 1 is then connected to the edge region 4 of the pressure relief valve assembly 2 via an adhesive or welded bond.

Alternatively, however, it is also conceivable that latching connection elements 10, in particular latching projections, are configured in or on the end region 8 of the side walls 6 opposite to the cover region 7, via which the base body can be connected, preferably releasably, to a pressure relief valve assembly 2 and in particular to an edge region 4 of a pressure relief valve assembly 2 which is preferably configured as an air vent assembly.

In this context, for example, reference is made to the illustration in FIG. 4C.

According to realizations of the cover 1 according to the invention, the sound-absorbing material, from which the base body is completely formed, is a sound-absorbing non-woven fabric, in particular made of mineral wool, synthetic fibers, and/or natural fibers.

It is also conceivable in this context that the sound-absorbing material is a sound-absorbing non-woven fabric, in particular made of plastic fibers of a thermoplastic material. In particular, the honeycomb-, rib-, or strut-shaped regions 5 of the base body can then, for example, also be formed from thermal treatment of the sound-absorbing material.

Referring to the illustrations in FIG. 5 to FIG. 10, a production variant of the cover 1 according to the invention is described in more detail below.

Figure 5:
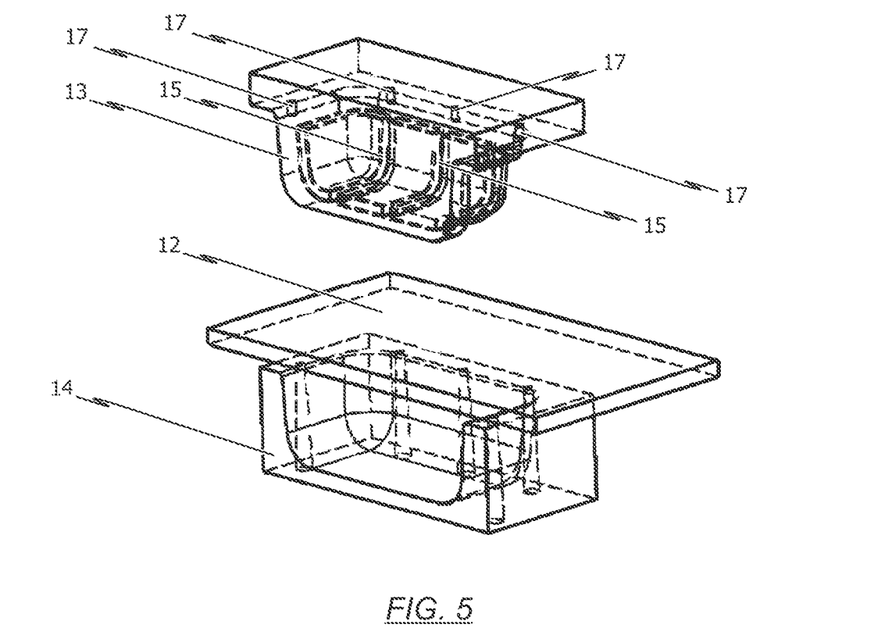
FIG. 5 shows schematically, and in a first isometric view, an exemplary embodiment of a molding tool having an at least substantially flat sound-absorbing material for production of the cover according to FIG. 3.
Figure 6:
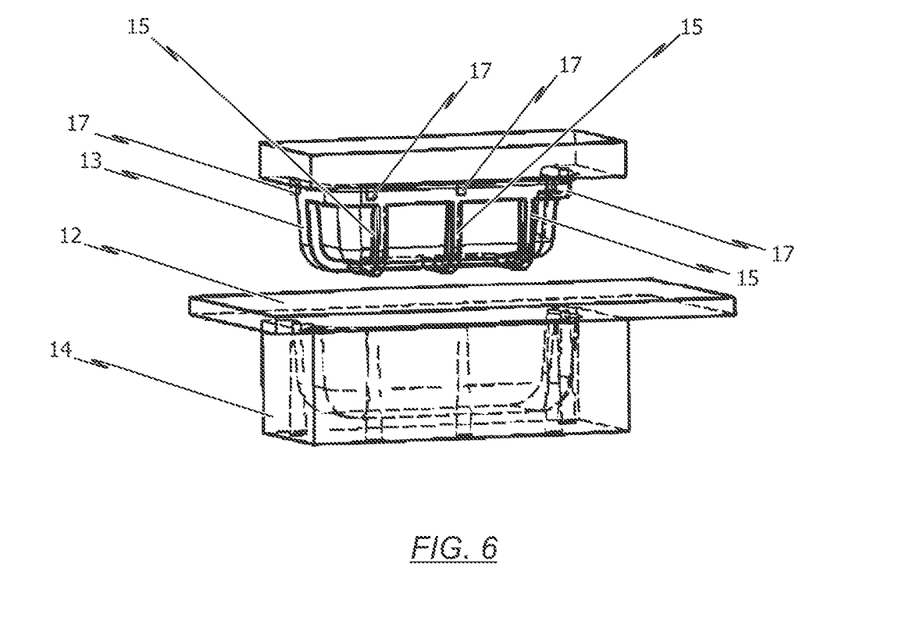
FIG. 6 shows schematically and in a second isometric view, the molding tool according to FIG. 3 with the substantially flat sound-absorbing material.

In particular, the flat sound-absorbing material 12 is initially provided in the form of a sheet of a non-woven material, for example.

Figure 7:
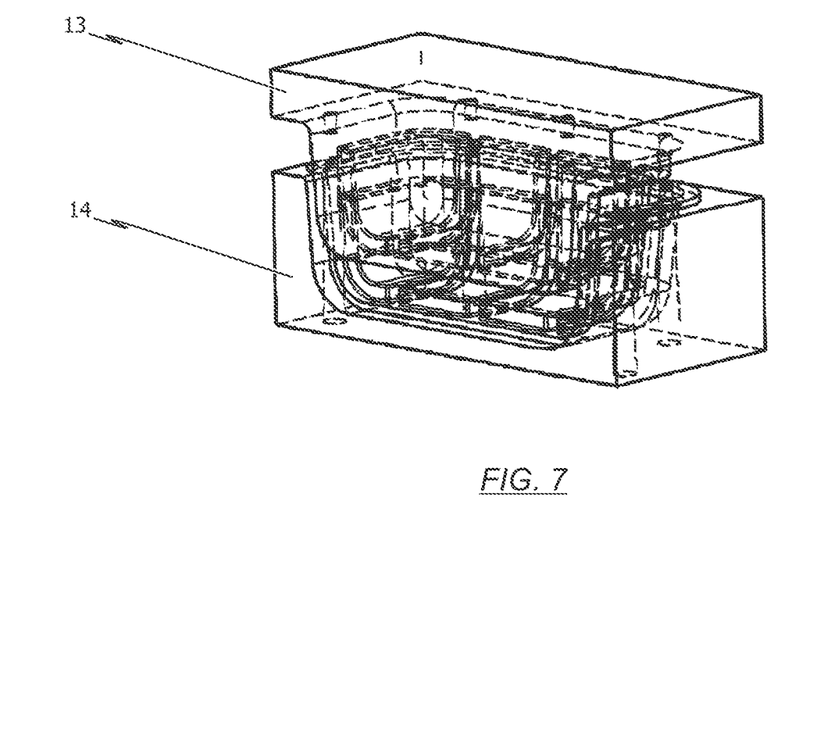
FIG. 7 shows schematically and in a partially transparent isometric view, the molding tool according to FIG. 5 during the reshaping of the provided sound-absorbing material.
Figure 8:
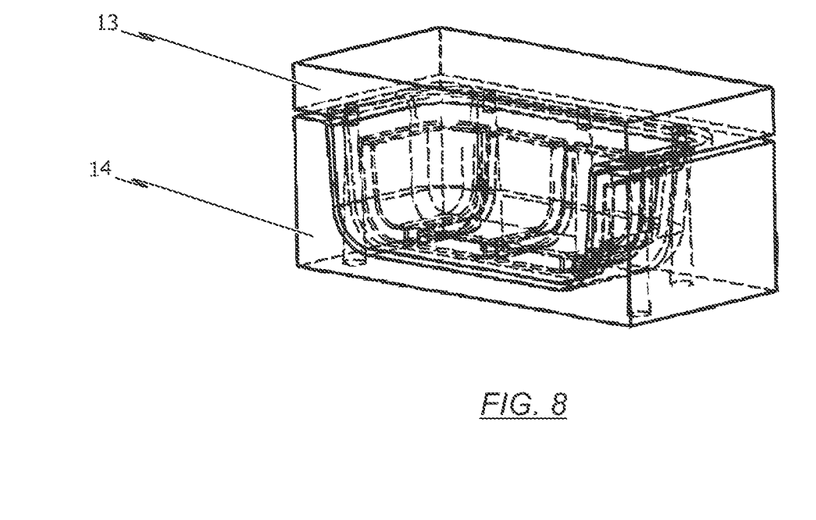
FIG. 8 shows schematically and in an isometric, partially transparent view, the molding tool according to FIG. 7 at the end of the reshaping operation.

Subsequently, the provided sound-absorbing material 12 is reshaped such that a base body is formed with side walls 6 and a cover region 7, which together delimit a three-dimensional muffler space.

In order to form the sound-absorbing material 12 provided, as shown in FIG. 4 and FIG. 5, for example, the sound-absorbing material 12 can be reshaped using a molding tool, preferably according to a compression molding or deep-drawing process. The molding tool preferably comprises a corresponding embossing die 13 and a die 14 in the form of a negative mold.

Figure 9:
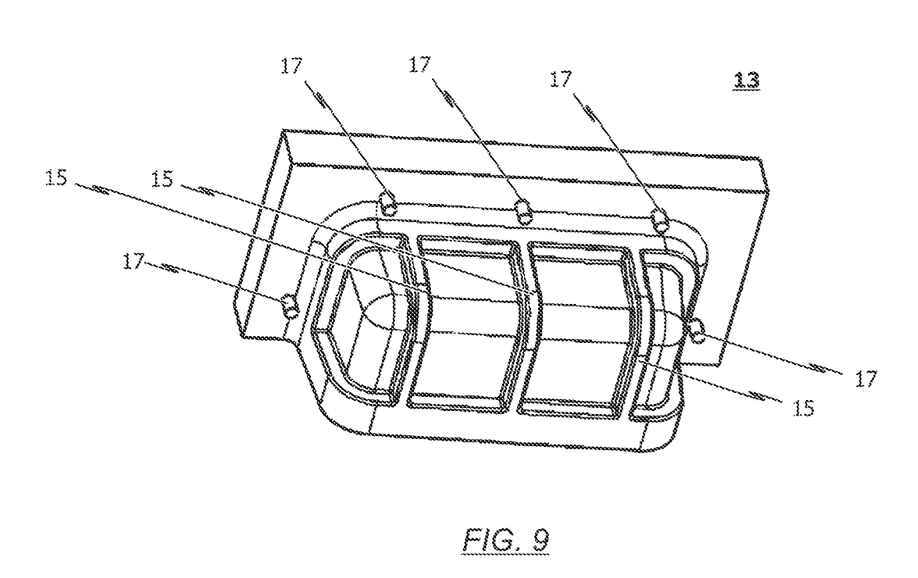
FIG. 9 shows schematically and in an isometric view, the embossing die of the molding tool according to FIG. 5.
Figure 10:
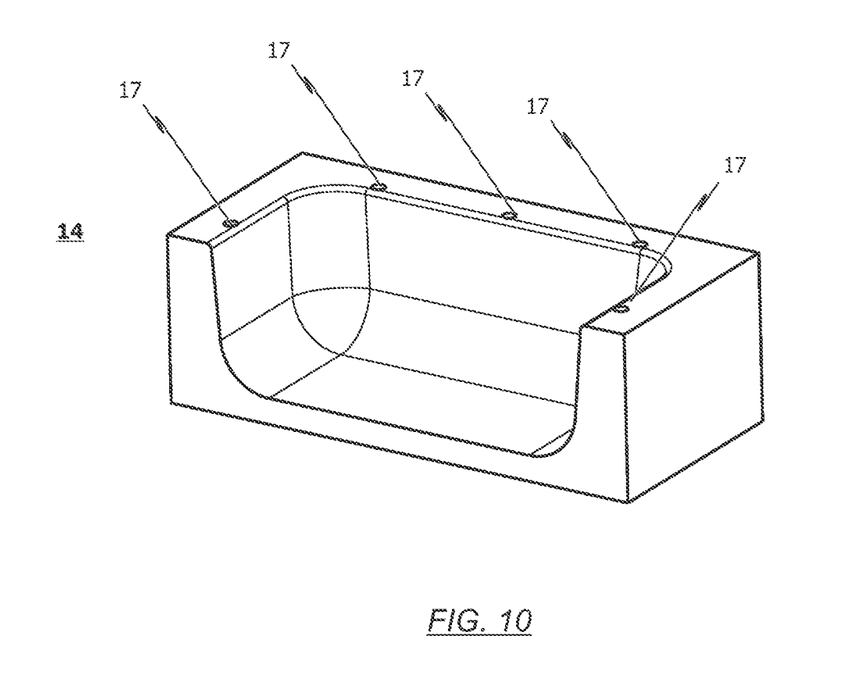
FIG. 10 shows schematically and in an isometric view, the die (negative mold) of the molding tool according to FIG. 5.

The embossing die 13 and the die 14 preferably comprise punched regions and/or groove regions 17 corresponding to each other and which are complementary to each other and via which holes 18 are introduced into the rim or flange region 9 of the base body of the cover 1 during the compression molding or deep-drawing process. The holes 18 preferably serve to position/orient and fasten the cover 1 to the edge region 4 of a pressure relief valve assembly 2.

As shown in the isometric views in FIG. 9 and FIG. 10, the embossing die 13 and die 14 have corresponding projecting regions 15, with which the sound-absorbing material 12 is manipulates during the reshaping process, in particular thermally treated and/or compressed or compacted, such that, in the base body, the aforementioned honeycomb-, rib-, or strut-shaped regions 5, in which the base body has an increased rigidity or strength, are formed in particular.

The other regions of the embossing die 13 or die 14 are designed such that, in the reshaping process, the sound-absorbing material 12 is only marginally compressed or compacted, if at all, so as to maintain the sound-insulating behavior of the sound-absorbing material 12 in these regions.

In this context, it is in particular also conceivable that the projecting or back-set regions 15 of the embossing die 13 and/or the die 14 can be heated locally, for example with the help of induction or heating coils, in order to cause a thermal deformation during the reshaping process in the corresponding regions of the sound-absorbing material 12.

Figure 11:
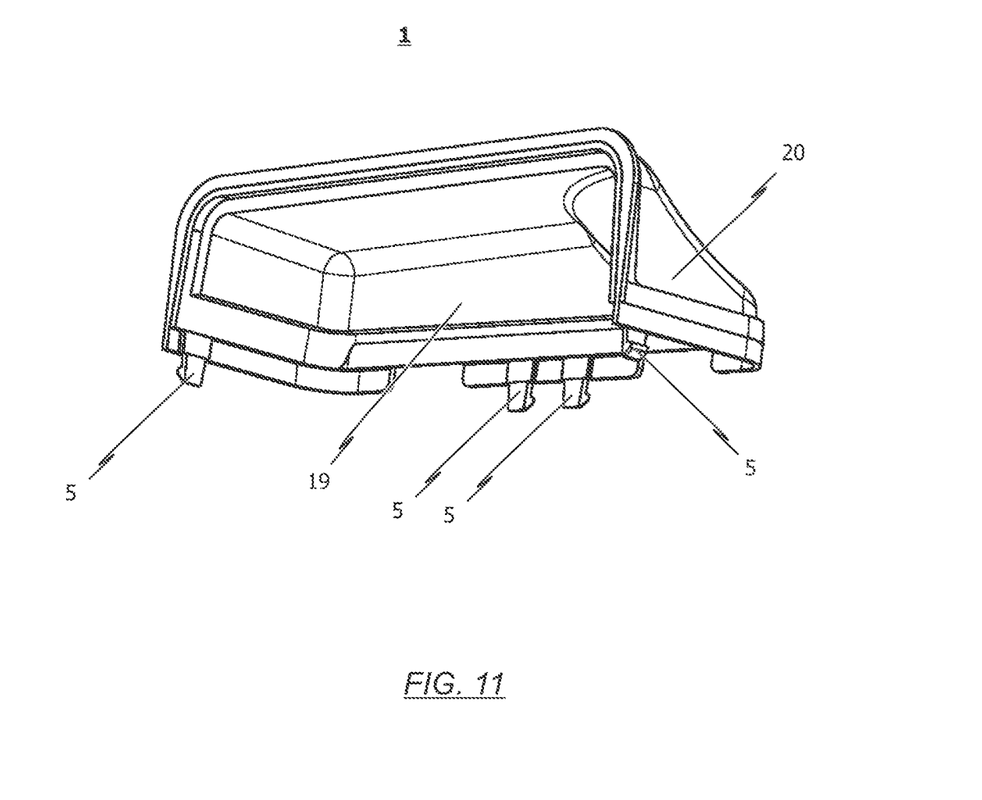
FIG. 11 shows schematically and in an isometric view, a further embodiment of a cover for a pressure relief valve assembly.

Referring now to the illustration in FIG. 11, a further embodiment of a cover 1 for a pressure relief valve assembly 2 will be described As shown in FIG. 11, the cover 1 comprises a base body 19 made of a sound-absorbing material which is uniform in terms of the material composition, wherein the base body 19 is partially supplemented with a plastic 20 in order to form a self-supporting composite component and is connectable to an edge region 4 of a pressure relief valve assembly 2. The plastic 20 is partially configured in order to form the self-supporting composite component by injection molding onto the base body 19.

When the cover is used as intended, said cover comprises inner wall regions facing in the direction of the pressure relief valve assembly 2 and outer wall regions facing away from the pressure relief valve assembly 2, wherein the plastic 20 is preferably exclusively and in particular partially present on the outer wall regions of the base body 19.

Upon injection of the plastic 20 onto the base body 19, latching means, in particular in the form of latching tabs 21, are formed, which are configured in order to form a latching connection with correspondingly complementary latching means in or on the edge region 4 of the pressure relief valve assembly.

Preferably, the base body 19 is formed by pressing, compression molding, and/or deep-drawing of a semi-finished product comprising the sound-absorbing material by means of a tool, wherein, in a further step, the base body is provided with the plastic 20 by injection molding. In the further step, the base body 19 is preferably provided with the plastic 20 by injection molding in the same tool.

The invention is not limited to the embodiments shown in the drawings, but rather results when all of the features disclosed herein are considered together.

LIST OF REFERENCE NUMERALS

1 Cover
2 Pressure relief valve assembly
4 Edge region of the pressure relief valve assembly
5 Rib/strut-shaped regions of the base body
6 Side walls of the base body
7 Cover region of the base body
8 End region of the side walls of the base body
9 Rim or flange region of the base body
10 Latching connection elements
11 Pressure relief valve/valve flap
12 Flat sound-absorbing material
13 Embossing die of the molding tool
14 Die of the molding tool
15 Projecting rib regions of the embossing die
17 Punched region
18 Holes
19 Base body
20 Injected plastic
21 Latching means/latching tabs
101 Cover (prior art)
106 Side walls of the cover (prior art)
107 Cover region of the cover (prior art)
110 Latching connection element (prior art)

The invention claimed is:

1. A cover for a pressure relief valve assembly of a vehicle,
wherein
the cover comprises a base body made of a sound-absorbing material which is uniform in terms of the material composition, wherein the base body is designed to be self-supporting and is connectable to an edge region of a pressure relief valve assembly;
wherein the base body is a one-piece, monolithic base body and comprises side walls and a cover region, which together delimit a three-dimensional muffler space;
wherein, during the production of the base body, the sound-absorbing material in an end region of the side walls opposite to the cover region and in a wall of the cover region has been compressed or otherwise compacted, at least partly or regionally such that at least one of the side walls and the wall of the cover region are configured with first segments having a first thickness and second segments having a second thickness that is less than the first thickness, wherein the first segments extend in a continuous manner from the one of the side walls and onto the cover region, wherein the second segments extend in a continuous manner from the one of the side walls and onto the cover region, such that the base body is configured with increased rigidity and/or strength in the end region.

2. The cover according to claim 1, wherein the base body is formed by reshaping the sound-absorbing material.

3. The cover according to claim 1,
wherein a rim or flange region is formed on the end region of the side walls opposite to the cover region, which projects radially outward at least regionally and via which the base body can be connected to the edge region; and/or
wherein latching connection elements, in particular latching projections, are configured in or on the end region of the side walls opposite to the cover region, via which the base body can be connected, releasably, to the edge region.

4. The cover according to claim 1,
wherein the sound-absorbing material is a sound-absorbing non-woven fabric made of mineral wool, synthetic fibers, and/or natural fibers; or
wherein the sound-absorbing material is a sound-absorbing non-woven fabric made of plastic fibers of a thermoplastic material.

5. The cover according to claim 1,
wherein the base body is partially supplemented with a plastic to form a self-supporting component.

6. The cover according to claim 5,
wherein, to form the self-supporting component, the base body is provided with the plastic partially by injection molding; or
wherein, to form the self-supporting component, the base body is connected to a plastic support structure, in the form of a plastic frame, with the aid of a form-fitting joining connection or with the aid of a material-locking joining connection.

7. The cover according to claim 5,
wherein, when the cover is used as intended, said cover comprises inner wall regions facing in a direction of the pressure relief valve assembly and outer wall regions facing away from the pressure relief valve assembly, wherein the plastic is exclusively present on the outer wall regions.

8. The cover according to claim 5,
wherein the base body is formed by pressing, compression molding, and/or deep-drawing a semi-finished product comprising the sound-absorbing material by means of a tool, wherein, in a further step, the base body is provided with the plastic by injection molding in the same tool; or
wherein the base body is formed by pressing, compression molding, and/or deep-drawing a semi-finished product comprising the sound-absorbing material by means of a tool, wherein, in a further step, the base body is fastened to or in a plastic frame, with the aid of a form-fitting joining connection or a material-locking joining connection.

9. A pressure relief valve assembly for vehicles, wherein the pressure relief valve assembly comprises at least one air vent having at least one pressure relief valve received in a frame or edge region and/or having at least one valve flap received in a frame or edge region, and a cover according to claim 1, wherein the base body of the cover is connected to the frame or edge region of the air vent, via at least one side wall of the base body, via at least one snap-fitting and/or latching connection.

10. The cover according to claim 1, wherein the end region comprises a rim or flange regions having a plurality of holes therein for fastening the cover to the edge region.

* * * * *